US012212480B2

(12) United States Patent
Lim et al.

(10) Patent No.: US 12,212,480 B2
(45) Date of Patent: Jan. 28, 2025

(54) LATENCY DETERMINATIONS FOR HUMAN INTERFACE DEVICES

(71) Applicant: NVIDIA Corporation, Santa Clara, CA (US)

(72) Inventors: David Lim, Cupertino, CA (US); Hsien-Li Lin, Taipei (TW); Tom Jozef Denis Verbeure, Sunnyvale, CA (US); Gerrit Slavenburg, Hayward, CA (US); Seth Schneider, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 371 days.

(21) Appl. No.: 17/064,452

(22) Filed: Oct. 6, 2020

(65) Prior Publication Data
US 2022/0109617 A1    Apr. 7, 2022

(51) Int. Cl.
*H04L 43/08*    (2022.01)
*G06F 3/14*    (2006.01)
(Continued)

(52) U.S. Cl.
CPC ............ *H04L 43/0858* (2013.01); *G06F 3/14* (2013.01); *H04L 43/065* (2013.01); *H04L 43/0852* (2013.01); *H04L 43/106* (2013.01)

(58) Field of Classification Search
CPC .............. H04L 43/0858; H04L 43/065; H04L 43/0852; H04L 43/106; H04L 41/145;
(Continued)

(56) References Cited

U.S. PATENT DOCUMENTS

2011/0090144 A1*  4/2011  Rajamani .............. A63F 13/358
                                                                  345/156
2011/0211049 A1   9/2011  Bassali et al.
(Continued)

FOREIGN PATENT DOCUMENTS

CN    103680368 A    3/2014
CN    105683882 A    6/2016
(Continued)

OTHER PUBLICATIONS

"Video Signal Input Lag Tester," Leo Bodnar Electronics, Retrieved from Internet URL : http://www.leobodnar.com/shop/index.php?main_page=product_info&products_id=212, accessed on Apr. 17, 2022, pp. 3.
(Continued)

*Primary Examiner* — Sahlu Okebato
(74) *Attorney, Agent, or Firm* — Taylor English Duma L.L.P.

(57) ABSTRACT

In various examples, latency of human interface devices (HIDs) may be accounted for in determining an end-to-end latency of a system. For example, when an input is received at an HID, an amount of time for the input to reach a connected device may be computed by the HID and included in a data packet transmitted by the HID device to the connected device. The addition of the peripheral latency to the end-to-end latency determination may provide a more comprehensive latency result for the system and, where the peripheral latency of an HID is determined to have a non-negligible contribution to the end-to-end latency, a new HID component may be implemented, a configuration setting associated with the HID component may be updated, and/or other actions may be taken to reduce the contribution of the peripheral latency to the overall latency of the system.

20 Claims, 9 Drawing Sheets

(51) Int. Cl.
*H04L 43/065* (2022.01)
*H04L 43/0852* (2022.01)
*H04L 43/106* (2022.01)

(58) Field of Classification Search
CPC ......... H04L 41/16; H04L 43/10; H04L 43/16; G06F 3/14; G06F 3/005; G06F 3/0304; G06F 3/038; G06F 2203/0383
See application file for complete search history.

(56) References Cited

U.S. PATENT DOCUMENTS

| | | | |
|---|---|---|---|
| 2015/0084979 A1* | 3/2015 | Bidarkar | G06F 3/14 345/593 |
| 2015/0109185 A1 | 4/2015 | Shimamura et al. | |
| 2016/0180811 A1* | 6/2016 | Colenbrander | A63F 13/30 356/402 |
| 2017/0177146 A1 | 6/2017 | Skaljak et al. | |
| 2018/0006920 A1* | 1/2018 | Godbole | H04L 43/106 |
| 2018/0068640 A1 | 3/2018 | Martin | |
| 2019/0227975 A1 | 7/2019 | Lund et al. | |
| 2019/0321725 A1 | 10/2019 | Zimring et al. | |
| 2020/0301814 A1 | 9/2020 | Phaneuf et al. | |

FOREIGN PATENT DOCUMENTS

| | | |
|---|---|---|
| CN | 105718362 A | 6/2016 |
| CN | 109074183 A | 12/2018 |
| CN | 111587137 A | 8/2020 |

OTHER PUBLICATIONS

Antoine, A., et al., "Using High Frequency Accelerometer and Mouse to Compensate for End-to-end Latency in Indirect Interaction", Proceedings of the ACM Conference on Human Factors in Computing Systems (CHI), HAL Open Science, pp. 1-12 (Apr. 2018).

Casiez, G., et al., "Looking through the Eye of the Mouse: A Simple Method for Measuring End-to-end Latency using an Optical Mouse", Proceedings of the ACM Conference on User Interface Software and Technology (UIST), HAL Open Science, pp. 1-9 (Nov. 10, 2015).

Cerveny, M., "VDI click to photon with raspberry-pi", Virtual GPU/Benchmarks—NVIDIA Developer Forums, Retrieved from Internet URL : https://web.archive.org/web/20210225093651/https://forums.developer.nvidia.com/t/vdi-click-to-photon-with-raspberry-pi/162237, accessed on May 18, 2022, pp. 12 (2016).

Johnsen, M., "How to use Click-to-Photon to measure End to End latency," Virtual Experience, Retrieved from Internet URL : https://web.archive.org/web/20190516221213/https://www.virtualexperience.no/2016/03/07/how-to-use-click-to-photon-to-measure-end-to-end-latency/, accessed on Apr. 17, 2022, pp. 3 (Mar. 7, 2016).

Spence, C., et al., "Audiovisual multisensory integration", Acoustical Science and Technology, The Acoustical Society of Japan, vol. 28, Issue 2, pp. 61-70 (2007).

Young, D., "NVIDIA Grid Days 2016 Recap, Key Takeaways, Technical Deep Dive and Lessons Learned!", ITVCE.Com, Retrieved from Internet URL : http://blog.itvce.com/2016/03/07/nvidia-grid-days-2016-recap-key-takeaways-technical-deep-dive-and-lessons-learned/, accessed on Apr. 17, 2022, pp. 26 (Mar. 7, 2016).

Non-Final Office Action dated May 26, 2021 in U.S. Appl. No. 16/893,327, 17 pages.

Final Office Action dated Nov. 1, 2021 in U.S. Appl. No. 16/893,327, 18 pages.

Non-Final Office Action dated Mar. 31, 2022 in U.S. Appl. No. 16/893,327, 17 pages.

Combined Search and Examination Report received for Great Britain Application No. GB2114323.5, mailed on May 11. 2022, 10 pages.

Examination Report for United Kingdom Patent Application No. GB2114323.5, filed Oct. 6, 2021, mailed Feb. 3, 2023, 5 ogs.

Notice of Intention to Grant for United Kingdom Patent Application No. GB2114323.5, filed Oct. 6, 2021, mailed Jun. 13, 2023, 2 pgs.

Lim, David; Third Office Action for Chinese Patent Application No. 202111172348.5, filed Oct. 8, 2021, mailed Jun. 26, 2024, 11 pgs. **English Abstract Included.

Lim, David; First Office Action for Chinese Patent Application No. 202111172348.5, Oct. 8, 2021, mailed Nov. 1, 2023, 13 pgs.

Lim, David; Second Office Action for Chinese Patent Application No. 202111172348.5, filed Oct. 8, 2021, mailed Mar. 1, 2024, 11 pgs.

* cited by examiner

200

```
USAGE PAGE (DESKTOP),           ; GENERIC DESKTOP CONTROLS (01H)
USAGE (MOUSE),                  ; MOUSE (02H, APPLICATION COLLECTION)
COLLECTION (APPLICATION),
    USAGE (POINTER),            ; POINTER (01H, PHYSICAL COLLECTION)
    COLLECTION (PHYSICAL),
        USAGE PAGE (BUTTON),    ; BUTTON (09H)
        USAGE MINIMUM (01H),
        USAGE MAXIMUM (10H),
        LOGICAL MINIMUM (0),
        LOGICAL MAXIMUM (1),
        REPORT SIZE (1),
        REPORT COUNT (16),
        INPUT (VARIABLE),
        USAGE PAGE (DESKTOP),   ; GENERIC DESKTOP CONTROLS (01H)
        USAGE (X),              ; X (30H, DYNAMIC VALUE)
        USAGE (Y),              ; Y (31H, DYNAMIC VALUE)
        LOGICAL MINIMUM (-32767),
        LOGICAL MAXIMUM (32768),
        REPORT SIZE (16),
        REPORT COUNT (2),
        INPUT (VARIABLE, RELATIVE),
        USAGE (WHEEL),          ; WHEEL (38H, DYNAMIC VALUE)
        LOGICAL MINIMUM (-127),
        LOGICAL MAXIMUM (127),
        REPORT SIZE (8),
        REPORT COUNT (1),
        INPUT (VARIABLE, RELATIVE),
        USAGE PAGE (CONSUMER),  ; CONSUMER (0CH)
        USAGE (AC PAN),         ; AC PAN (0238H, LINEAR CONTROL)
        REPORT COUNT (1),
        INPUT (VARIABLE, RELATIVE),
        USAGE PAGE (FF00H)
        USAGE (ANY VALUE THAT IS NOT USED FOR THE DEVICE'S 0XFF00 PAGE)
        REPORT COUNT (1),
        REPORT SIZE (16),
        INPUT (VARIABLE, RELATIVE),
    END COLLECTION,
END COLLECTION
```

FIGURE 2A

| FIELD | LENGTH (BITS) | OFFSET (BITS) | DECODED | HEX VALUE | DESCRIPTION |
|---|---|---|---|---|---|
| BUTTON 1 | 8 | 0 | 1 | 0x01 | BUTTON 1 |
| BUTTON 2 | 8 | 0 | 0 | 0x01 | BUTTON 2 |
| BUTTON 3 | 8 | 0 | 0 | 0x01 | BUTTON 3 |
| BUTTON 4 | 8 | 0 | 0 | 0x01 | BUTTON 4 |
| BUTTON 5 | 8 | 0 | 0 | 0x01 | BUTTON 5 |
| BUTTON 6 | 8 | 0 | 0 | 0x01 | BUTTON 6 |
| BUTTON 7 | 8 | 0 | 0 | 0x01 | BUTTON 7 |
| BUTTON 8 | 8 | 0 | 0 | 0x00 | BUTTON 8 |
| BUTTON 9 | 8 | 0 | 0 | 0x00 | BUTTON 9 |
| BUTTON 10 | 8 | 8 | 0 | 0x00 | BUTTON 10 |
| BUTTON 11 | 8 | 8 | 0 | 0x00 | BUTTON 11 |
| BUTTON 12 | 8 | 8 | 0 | 0x00 | BUTTON 12 |
| BUTTON 13 | 8 | 8 | 0 | 0x00 | BUTTON 13 |
| BUTTON 14 | 8 | 8 | 0 | 0x00 | BUTTON 14 |
| BUTTON 15 | 8 | 8 | 0 | 0x00 | BUTTON 15 |
| BUTTON 16 | 8 | 8 | 0 | 0x00 | BUTTON 16 |

| FIELD | LENGTH (BITS) | OFFSET (BITS) | DECODED | HEX VALUE | DESCRIPTION |
|---|---|---|---|---|---|
| X | 16 | 16 | 0x0004 | 0x0004 | X |
| Y | 16 | 32 | 0xFFFA | 0xFFFA | Y |
| WHEEL | 8 | 48 | 0x00 | 0x00 | WHEEL |

| FIELD | LENGTH (BITS) | OFFSET (BITS) | DECODED | HEX VALUE | DESCRIPTION |
|---|---|---|---|---|---|
| AC PAN | 8 | 56 | 0x00 | 0x00 | AC PAN |

| FIELD | LENGTH (BITS) | OFFSET (BITS) | DECODED | HEX VALUE | DESCRIPTION |
|---|---|---|---|---|---|
| BUTTON LATENCY | 16 | 64 | 0x00CD | 0x00CD | BUTTON LATENCY |

FIGURE 2B

LATENCY DETERMINATIONS FOR HUMAN INTERFACE DEVICES

CROSS-REFERENCE TO RELATED APPLICATIONS

This application is related to U.S. Non-Provisional application Ser. No. 16/893,327, filed on Jun. 4, 2020, U.S. Provisional Application No. 63/029,343, filed on May 22, 2020, and U.S. Provisional Application No. 62/970,096, filed on Feb. 4, 2020, each of which is hereby incorporated by reference in its entirety.

BACKGROUND

As the number of high performance applications increases—such as gaming applications, virtual reality (VR) applications, augmented reality (AR) applications, and/or mixed reality (MR) applications—the performance of computing systems executing these application becomes more critical. For example, to execute a first person shooter (FPS) type game, the computing system—e.g., a gaming console, a personal computer, a cloud gaming system, etc.—should be configured such that end-to-end latency of the system is at a level that provides a positive user experience. To understand and account for latency within a computing system, conventional techniques have implemented systems for measuring a single end-to-end latency value. For example, customized hardware components—such as a high speed camera—may be implemented to detect when an input event occurs (e.g., by detecting an LED light indicator on a peripheral device equipped with the same), when a display event occurs, and to (e.g., manually) calculate a time difference—or latency—between the two. However, this process of end-to-end latency measurement requires specialized equipment—e.g., a high speed camera and a peripheral device with a visual input indicator—while also producing only a single end-to-end latency value. The drawback of a single latency value is that various factors can contribute to the end-to-end latency of a system, such as peripheral latency, application latency, render latency, and/or display latency. As such, without knowing the individual contributions of each of these factors to the end-to-end system latency, it may prove difficult to determine configuration setting updates, necessary changes to hardware and/or software of the system, and/or other actions that may be taken to reduce the end-to-end latency of the system.

SUMMARY

Embodiments of the present disclosure relate to accounting for human interface devices (HIDs) in end-to-end system latency determinations. Systems and methods are disclosed that determine a latency contribution of a HID using data at least partly generated and transmitted by the HID device. For example, when an input is received, an amount of time (e.g., peripheral latency) that it takes for data representative of the input to reach a connected device—such as a personal computer (PC), a display (e.g., a display implementing a pass-through universal serial bus (USB) port), etc.—may be computed by the HID and included in a data packet transmitted by the HID device to the connected device.

As such, and in contrast to conventional systems, specialty hardware is not required to compute the end-to-end latency of the system, and individual contributions to the end-to-end latency may be computed at a more granular level—e.g., to include the peripheral latency as computed by the HID device. When implemented in an end-to-end latency determination system—such as described in U.S. Non-Provisional application Ser. No. 16/893,327, filed on Jun. 4, 2020, and incorporated by reference herein—the addition of the peripheral latency to the end-to-end latency determination may provide a more comprehensive result. For example, in addition to determining the latency from when an input is received by the connected device until the input results in a change in the display, the peripheral latency may include the additional amount of time from the physical input being registered by the HID to the receipt of the input data at the connected device. As such, where the peripheral latency of an HID is determined to have a non-negligible contribution to the end-to-end latency, a new HID component may be implemented, a configuration setting(s) associated with the HID component (e.g., a polling rate) may be updated, and/or other actions may be taken to reduce the contribution of the peripheral latency to the end-to-end latency of the system.

The end-to-end latency of the system may be computed, in embodiments, by a display device of the system. For example, a processor(s) residing within the display device may be used to compute the end-to-end latency by factoring in peripheral latency, application latency, render latency, display latency, and/or other latency contributions. In such an embodiment, the display device may include pass-through functionality for a connection type (e.g., universal serial bus (USB), serial port, parallel port, Ethernet, etc.) of the HID, and may intercept (e.g., using an interception device, such as a field programmable gate array (FPGA)) the peripheral latency data from data packets transmitted by the HID, through the display device, and to the computing device (e.g., a gaming console, a desktop computer, a laptop computer, a tablet, etc.). As such, the processor(s) of the display device may be used to compute the end-to-end latency of the system agnostic to the particular type of computing device executing the application—thereby allowing for more universal adoptability of the end-to-end latency determination system.

BRIEF DESCRIPTION OF THE DRAWINGS

The present systems and methods for accounting for human interface devices in end-to-end system latency determinations are described in detail below with reference to the attached drawing figures, wherein:

FIG. 2A is an illustration of a report descriptor corresponding to a human interface device, in accordance with some embodiments of the present disclosure;

FIG. 2B is an illustration of example data fields of a data packet corresponding to a human interface device, in accordance with some embodiments of the present disclosure;

DETAILED DESCRIPTION

Systems and methods are disclosed related to accounting for human interface devices (HIDs) in end-to-end system latency determinations. Although the present disclosure is described primarily with respect to a computer mouse as an HID, this is not intended to be limiting. The HID device(s) latency determinations described herein may correspond to any type of HID device, such as a computer mouse, a keyboard, a controller device, a game pad, a joystick, a remote, a microphone, a track pad, a virtual reality (VR) headset, an augmented reality (AR) headset or eyewear, a mixed reality (MR) headset or eyewear, a display, a touch screen display, a barcode reader, an image scanner, a camera (e.g., webcam, digital camera, etc.), a light pen, a steering wheel, a scanner, and/or other types of peripheral or HID devices. In addition, although the present disclosure is described primarily with respect to gaming implementations, this is not intended to be limiting. For example, the peripheral device latency may be used to calculate latency with respect to any type of application, such as gaming applications, streaming applications, computer aided design (CAD) applications, video, photo, or sound editing applications, VR, AR and/or MR applications, video conferencing applications, robotics applications, ground and/or aerial vehicle applications (e.g., autonomous, semi-autonomous, driver-assisted, etc.), simulation applications, and/or other application types. The systems and methods described herein may be implemented in local computing systems, cloud computing systems, or a combination thereof. The connections between HIDs or peripheral devices may include wired connections, wireless connections (e.g., using wireless transceivers), or a combination thereof.

Figure 1A:
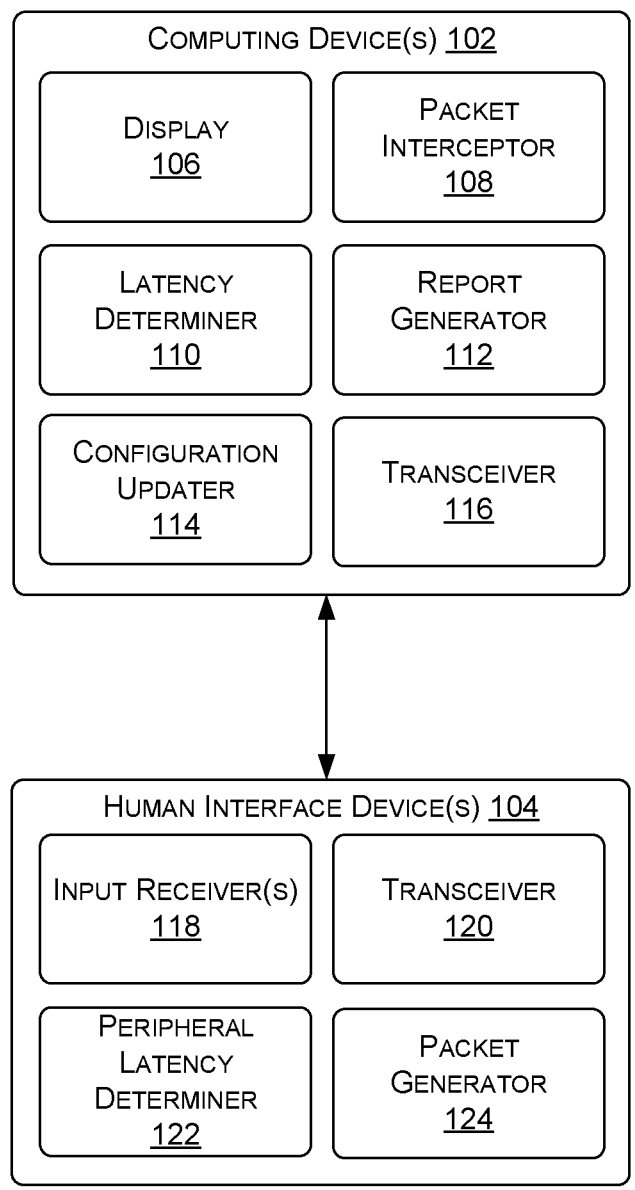
FIG. 1A is a block diagram of an end-to-end latency determination system, in accordance with some embodiments of the present disclosure.

With reference to FIG. 1A, FIG. 1A is a block diagram of an end-to-end latency determination system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 100 may be executed using similar components, features, and/or functionality as described herein with respect to example computing device 600 of FIG. 6. The system 100 may, in embodiments, be part of a cloud computing architecture that may use one or more data centers (or components, features, and/or functionality thereof), such as example data center 700 of FIG. 7. Further, in some embodiments, such as where the system 100 includes a content streaming system (e.g., game streaming, AR/VR streaming, video streaming, video conferencing, etc.), the system 100 may include similar components, features, and/or functionality described herein with respect to example content streaming system 500 of FIG. 5.

The system 100 may include one or more computing devices 102 and/or one or more human interface devices (HIDs) 104. The computing device(s) 102 may include, without limitation, one or more of the types of computing devices described with respect to content server(s) 502 and/or client device(s) 504 of FIG. 5, example computing devices 600 of FIG. 6, example data center(s) 700 of FIG. 7, and/or other computing device types. For example, the computing device(s) 102 may include a laptop, desktop, display device, game console, VR and/or AR system, tablet, smart phone, cloud computing system, virtual machines, another computing device type, or a combination thereof.

Figure 5:
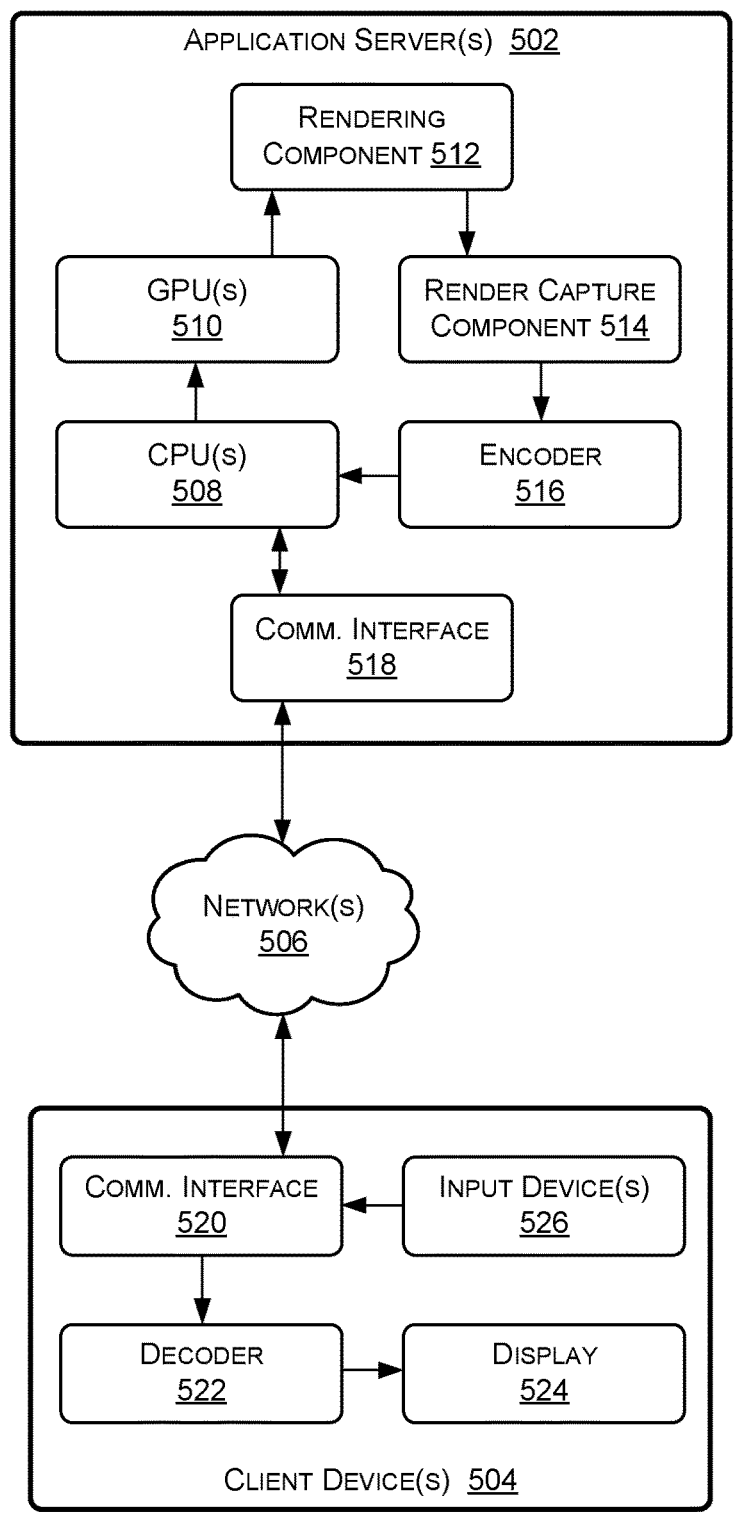
FIG. 5 is a block diagram of an example content streaming system suitable for use in implementing some embodiments of the present disclosure.
Figure 6:
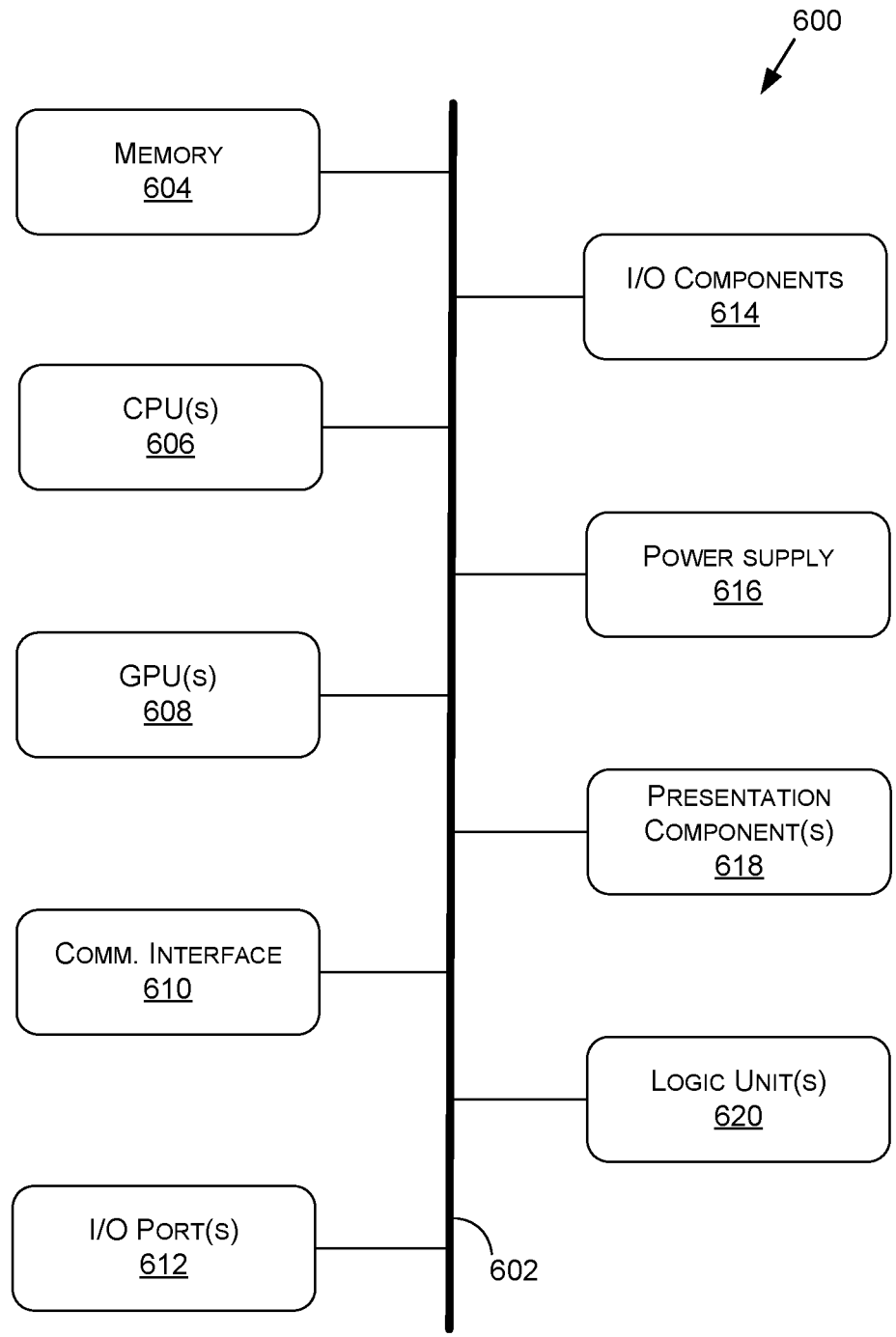
FIG. 6 is a block diagram of an example computing device suitable for use in implementing some embodiments of the present disclosure.

As described herein, the HID(s) 104 may include, without limitation, one or more of input device 526 of FIG. 5, one or more of input/output (I/O) devices 614 of FIG. 6, and/or one or more other HID device types. For example, the HID(s) 104 may include a computer mouse, a keyboard, a controller, a game pad, a joystick, a remote, a microphone, a track pad, a virtual reality (VR) headset, an augmented reality (AR) headset or eyewear, a mixed reality (MR) headset or eyewear, a touch screen display, a barcode reader, an image scanner, a camera (e.g., webcam, digital camera, etc.), a light pen, a steering wheel, a scanner, another types of peripheral or HID device, or a combination thereof.

The computing device(s) 102 may include a display 106. For example, the display 106 may include similar components, features, and/or functionality as display 524 of FIG. 5 and/or presentation component(s) 618 of FIG. 6. In some embodiments, the display 106 may include a touchscreen display, in embodiments, and may correspond to a HID 104 of the system 100. The display 106 may include, in embodiments, one or more components for determining an end-to-end latency of the system 100. For example, with respect to system 100A of FIG. 1B—e.g., a non-limiting example embodiment of the end-to-end latency determination system 100 of FIG. 1A—the display 106 may include a central processing unit(s) 150, a field programmable gate array (FPGA) 154, and/or other components including but not limited to those described herein. In such embodiments, the display 106 may be used to determine the end-to-end latency of the system 100A such that the latency may be determined agnostic to the type of computing device(s) 102 being implemented. For example, the display 106 may determine the end-to-end latency of the system 100A where the computing device(s) 102 is a game console and may also determine the end-to-end latency where the computing device(s) 102 is a desktop computer. Similarly, where the computing devices 102 and/or components, features, and/or functionality thereof are manufactured or provided by different providers or companies, the display 106 may still accurately determine the end-to-end latency of the system 100A. As such, where a first computing device 102 includes a graphics processing unit (GPU) 132 manufactured by a first company and a second computing device 102 includes a GPU 132 manufactured by a second company, the end-to-end latency may be accurately determined for both the first and second computing devices 102. The system 100A may include, in some embodiments, similar components, features, and/or functionality to those described in U.S. Non-Provisional application Ser. No. 16/893,327, filed on Jun. 4, 2020, which is incorporated by reference herein in its entirety.

Packet interceptor 108 may intercept packets received from the HID(s) 104. For example, packet generator 124 of the HID(s) 104 may generate a packet that includes data representative of peripheral (or HID) latency information of the HID(s) 104, and transceiver 120 (which may include a transmitter, a receiver, and/or a transceiver) may transmit the packet to the computing device(s) 102—e.g., over a wired and/or wireless connection or communication type, such as universal serial bus (USB), Ethernet, Bluetooth, Bluetooth Low Energy (BLE), etc. The packet interceptor 108 of the computing device(s) 102—and/or the display 106 thereof, such as where pass-through functionality is implemented—may intercept the packet and determine the latency information therefrom. For example, when an input is received by an input receiver(s) 118 of the HID(s) 104, the peripheral latency determiner 122 may determine an amount of time from receipt of the input to successful transmission—e.g., using the transceiver 120 and/or transceiver 116 (which may include a receiver, a transmitter, and/or a transceiver)—of a packet including data representative of the input (e.g., input data) to the computing device(s) 102. This amount of time may correspond to the peripheral latency of the HID(s) 104—or a particular input receiver(s) 118 thereof.

In some examples, the input receiver(s) 118 may include a button (such as a mouse button, a keyboard button, a remote control button, a game controller button, etc.), a display (such as a touch screen), a track pad, a motion determining device (e.g., an inertial measurement unit (IMU) sensor and/or another type of component, feature, and/or functionality for measuring rotation and/or translation of the HID(s) 104—e.g., to measure movement of a mouse, a joystick, control pad, controller, etc.), and/or another type of input receiver(s) 118. As such, the input receiver(s) 118 may receive an input and generate data that represents the input, and this data may be included in a packet generated by the packet generator 124 and transmitted to the computing device(s) 102.

In some embodiments, the packet interceptor 108 may intercept the packet—e.g., may determine that a packet including peripheral latency data has been received and may retrieve or receive the latency data from the packet for use by a latency determiner 110 in determining the peripheral latency and/or for using the peripheral latency in determining the end-to-end latency of the system 100. As such, the packet may be used other components, features, and/or functionality of the system 100 (e.g., for use in updating an application state for rendering) other than the latency determiner 110, and the packet interceptor 108 may intercept the packet for use by the latency determiner 110 (such as described with respect to the FPGA 154 of FIG. 1B). In other embodiments, the packet interceptor 108 may not intercept the packet, but may correspond to a receiver of the packet as identified in the transmission. For example, where pass-through functionality is not implemented the packet including the peripheral latency information may be transmitted from the HID(s) 104 to the computing device(s) 102 directly or with pass-through functionality, but without interception. In such embodiments, the packet interceptor 108 may alternatively be referred to as a packet receiver 108. As such, where the computing device(s) 102—and not a separate device, such as the display 106, as described with respect to FIG. 1B—executes the latency determiner 110, the packet receiver 108 may be implemented.

Figure 1B:
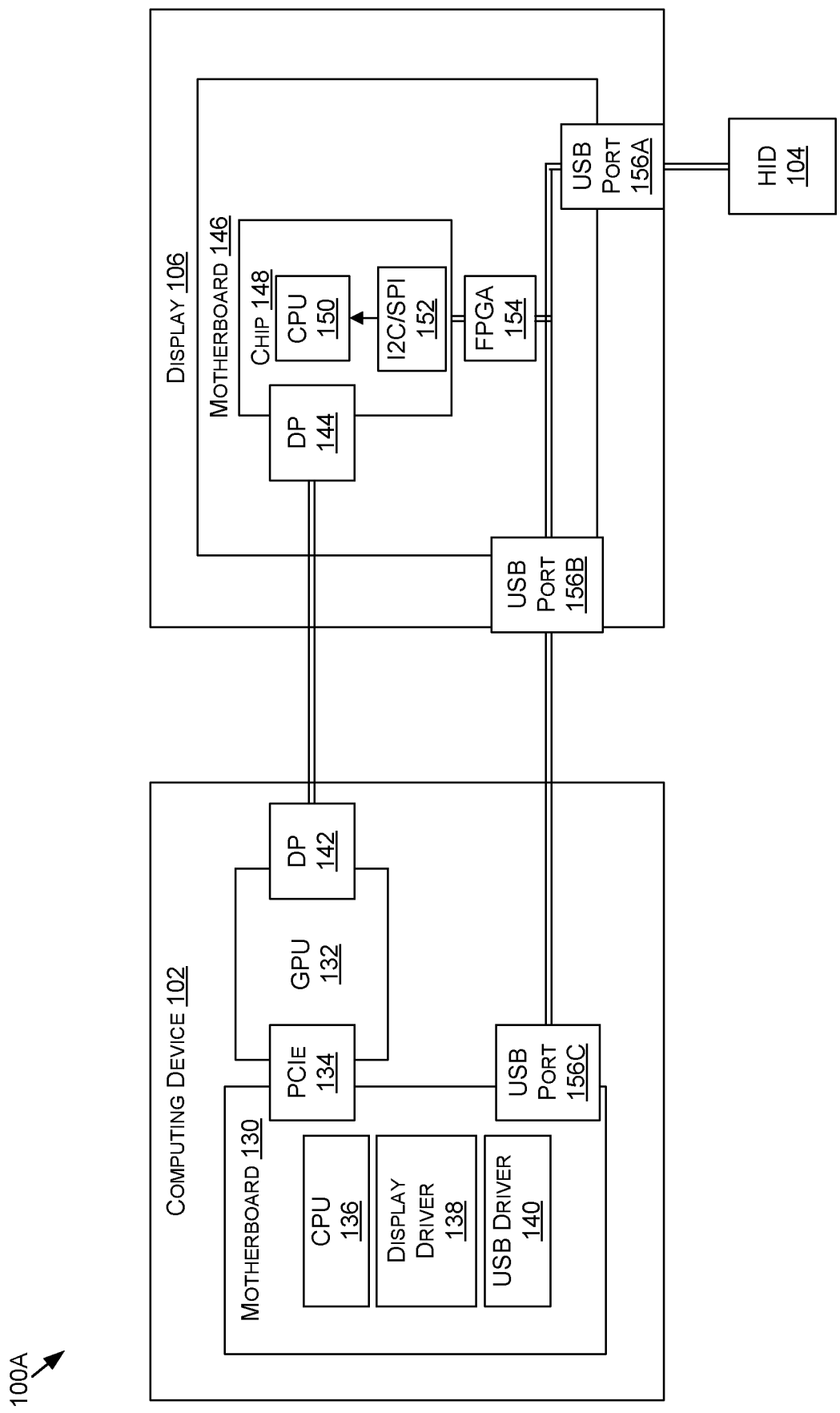
FIG. 1B is a block diagram of an example configuration for an end-to-end latency determination system, in accordance with some embodiments of the present disclosure.

To determine the peripheral latency, the peripheral latency determiner 122 may analyze data corresponding to the receipt of an input(s) by the input receive(s) 118 and the receipt of a packet including the input data by the computing device(s) 102—and/or a pass-through device, such as the display 106 in FIG. 1B. To determine the receipt of the input(s), a timestamp may be generated at a time of receipt of the input. For example, when a mouse button, control pad, or keyboard button is pressed, a joystick is manipulated, a mouse cursor is moved, a touchpad is touched, a display is touched or pressed, and/or another input type is received, a timestamp may be generated and stored by the HID(s) 104. In addition, a timestamp may be generated when a packet—as generated using the packet generator 124—including the input data is successfully received by and/or transmitted to the computing device(s) 102. For example, the HID(s) 104 may determine successful transmission and/or receipt of the packet, and may generate a timestamp when the successful transmission and/or receipt is determined. As another example, the HID(s) 104 may determine successful transmission and/or receipt of the packet based on a return signal from the computing device(s) 102—and/or a pass-through device, such as the display 106 of FIG. 1B. In such embodiments, the timestamp may be generated by the computing device(s) 102 and included in the return signal. In either embodiment, the HID(s) 104 may use the timestamp corresponding to the time of receipt of the input and the timestamp corresponding to the time of successful transmission and/or receipt of the packet including the input data by the computing device(s) 102, and the peripheral latency determiner 122 may use these timestamps to determine the peripheral latency of the HID(s) 104. For example, the difference between the timestamps may be computed to determine the peripheral latency.

Once a peripheral latency is determined, the packet generator 124 may generate a packet including the peripheral latency information. The packet may include the peripheral latency information alone, and/or may include input data corresponding to the input used in determining the peripheral latency and/or input data corresponding to a subsequent input. Where the input data corresponds to a subsequent input, the packet may include data referencing the input that the peripheral latency corresponds to.

The HID(s) 104—e.g., during initialization, at startup, during configuration, when plugged in or otherwise communicatively coupled, periodically, etc.—may transmit a report descriptor 200 to the computing device(s) 102. The report descriptor 200 may include information that identifies the HID(s) 104 (e.g., type, model, vendor, identifier, etc.) being implemented, the associated latency (where applicable), the number of input receivers and/or types of input receivers of the HID(s) 104, the format of the data packets that are transmitted by the HID(s) 104, and/or other information. For example, the report descriptor 200 may include data that indicates to the computing device(s) 102 which bits and/or bytes of the data packets from the HID(s) 104 correspond to which information. As such, when a data packet including information representative of HID report 210 is received by the computing device(s) 102, the computing device(s) 102 knows that there are 16 buttons, a length of the input information corresponding to those buttons is 8 bits, with an offset of 0 or 8 bits, and/or a hex value of 0x01 or 0x00. Similarly, the computing device(s) 102 may understand data corresponding to an X location or translation, a Y location or translation, and wheel input information (e.g., where the HID report 210 corresponds to a mouse), as well as AC Pan information, and button latency information. These data fields are for example purposes only, and are not intended to be limiting. For example, for a joystick, the data fields may include X, Y movement information and/or button inputs, in addition to latency information. For a game controller, the data fields in the HID report 210 may include joystick movements, button types, and/or latency information. As such, the report descriptor 200 may indicate to the computing device(s) 102—and/or the pass-through devices, such as the display 106 of FIG. 1B—the location with the data packet of each of the different data fields. With respect to the packet interceptor 108 (and/or packet receiver 108), the information about the latency data field(s) may be used to determine or retrieve the peripheral latency of the HID(s) 104 from the received packets. As illustrated in FIG. 2A, the bolded and underlined portions of the report descriptor may correspond to the peripheral latency data field(s) of the HID report 210. As such, where conventional systems may have used separate hardware—such as high speed cameras and LED lights—to determine peripheral latency, the system 100 may determine the peripheral latency without requiring additional hardware, and may include the peripheral latency as additional information in the data packets transmitted by the HID(s) 104 to the computing device(s) 102.

In some embodiments, the peripheral latency determiner 122 may be executed by the computing device(s) 102. For example, a type and/or model of the HID(s) 104 may be determined—e.g., using the report descriptor 200 corresponding to the HID(s)—and this information may be used to determine associated latency information for the HID(s) 104. As such, the peripheral latency determiner 122 may reference a lookup table or other data representation that includes a listing of HID types—e.g., by model number, vendor identifier, product identifier, serial number, device identifier, unique identifier, etc.—and associated (e.g., predetermined) latency information. As such, the peripheral latency determiner 122 may be part of the latency determiner 110 for determining an end-to-end latency of the system 100—and/or the individual contributions thereto. For example, where an end-to-end latency of the system is determined to be 38 milliseconds (ms), and the associated latency for the HID 104 is 8 ms, a report may be generated by the report generator 112 indicating that the end-to-end latency is 38 ms and that the HID 104 contributes 8 ms to that 38 ms, or that 21% of the latency is caused by the HID 104. This information may be useful for the user—e.g., to determine if a different type or model of HID device would reduce the end-to-end latency—and/or by the computing device(s) 102 to update configuration settings using a configuration updater 114. For example, if a desired latency is 30 ms, HID related configuration settings may be updated—e.g., automatically, periodically, and/or dynamically—by the system 100 to decrease the peripheral latency contribution. As such, a polling rate of the computing device(s) 102 may be increased such that the HID information is received more often. In such an example, where peripheral latency is determined to be above some threshold—e.g., 8 ms, 12 ms, 15 ms, etc.—the polling rate may be updated (e.g., until the peripheral latency for subsequent inputs drops below the threshold).

In addition to, or alternatively from, updating HID related configuration settings, the system 100 may—e.g., automatically, periodically, and/or dynamically—update other configuration settings of the system. For example, the frame rate, refresh rate, and/or image quality of the system 100 may be updated. As another example, one or more settings may be enabled or disabled, such as V-sync, G-sync, and/or other settings of the display 106, for example. In other examples, the peripheral latency information may be used for anti-cheat applications, such as where changes in the peripheral latency information do not conform with predetermined or learned latency patterns (e.g., where changes in latency information are greater than a threshold value) for an HID(s) 104, the system 100 may determine that a user or bot is cheating.

In some embodiments, the report generator 112 may generate reports by request, at an interval, periodically, automatically, dynamically, and/or otherwise. The reports may include information about the latency of the system 100—such as the individual components of latency and/or the end-to-end latency value. The report generator 112 may determine changes in latency values over time, and may generate reports when values fluctuate beyond certain threshold amounts. For example, where a peripheral latency fluctuates more than 5 ms, 8 ms, 10 ms, etc., the report generator 112 may generate a report and/or may generate and/or display a notification or indication of the detected changes in the report. Similarly, where a latency value is above a threshold, or drops below a threshold, the report generator 112 may generate a report and/or may generate and/or display a notification or indication of the latency value threshold information. This information may be useful to the system 100 and/or a user in determining the current performance of the system 100, and whether any configuration updates have been helpful to decreasing latency and/or have increased latency, and/or may be helpful in determining whether configuration settings need or should be updated. The configuration updater 114 may, in embodiments, use the reports to automatically update configuration settings and/or to generate prompts or notifications for users of recommended updates that may be used to improve latency. In some embodiments, the user may be able to configure the threshold values and corresponding configuration setting updates that should result when thresholds are met. This may include increasing polling rates when the peripheral latency values increase beyond a threshold peripheral latency value or decreasing polling rates when the peripheral latency values decrease below a threshold peripheral latency value. Another example may include decreasing image quality when the end-to-end latency exceeds a threshold, or increasing image quality when the end-to-end latency drops below a threshold. The threshold values may include multiple tiers, in embodiments, such that when a first high threshold is met, the image quality is decreased a first amount, and at a second high threshold, the image quality is decreased more than at the first high threshold, and so on. This tiered thresholding may also be implemented for HID related configuration settings, display settings, render settings, application settings, and/or for other settings that may contribute to the latency of the system 100.

With reference to FIG. 1B, FIG. 1B includes an example non-limiting embodiment of the system 100. The system 100A includes a display 106 communicatively coupled to a computing device 102. The HID 104—e.g., a mouse—may be coupled to the computing device(s) 102 via pass-through functionality of the display 106. As such, a (wired or wireless) USB connection may be established between the HID 104 and the display 106 and a (wired or wireless) USB connection may be established between the display 106 and the computing device 102. As such, when a packet is received by USB port 156A of the display 106 from the HID 104, the display 106 may pass the packet through USB port 156B to USB port 156C of the computing device 102. In some embodiments, when a packet is received from the HID 104, the FPGA 154 of the display—e.g., acting as the packet interceptor 108 of FIG. 1A—may determine that a packet has been received and/or may retrieve or intercept the peripheral latency information from the packet (e.g., where the location of the data field(s) corresponding to the peripheral latency are known from the report descriptor 200). This peripheral latency information may be passed to CPU 150 I2C/SPI 152 (e.g., a half-duplex, full duplex, or another type of communication protocol). The CPU 150 may be a component of a chip (or integrated circuit) that is included on a motherboard 146 of the display 146. The CPU 150 may execute a latency determiner 110 which may determine the end-to-end latency of the system 100A using the peripheral latency information and/or one or more other components of latency—e.g., application latency, render latency, and/or display latency.

As an example, the packet from the HID 104 that is passed through to the computing device 102 may be received by the computing device 102 and used to determine the input information from input data in the packet. For example, components on a motherboard 130 of the computing device 102—such as a CPU 136, a display driver 138, and/or a USB driver 140—may be used to determine an input, update an application state, and transmit the application state information to a GPU 132 (e.g., via a PCIe connection 134) for rendering. The rendered information—e.g., a frame corresponding to the application and reflecting the received input data—may be transmitted to the display 106 (e.g., via display port (DP) connections 142 and 144). The display 106 may then display the frame. The CPU 150 may determine the additional latency information from the frame—or the display thereof—in embodiments. As such, the system 100A may be used to determine the peripheral latency associated with the HID 104 and/or may be used to determine end-to-end latency of the system using a pass-through functionality of the display 106.

The specific connection and device types described with respect to FIG. 1B are not intended to be limiting, and different connection and device types may be used. For example, without limitation, Ethernet may be used instead of USB, HDMI may be used instead of DP, the functionality of the FPGA may be implemented on the CPU 150 itself, or included on the chip 148, etc. In addition, although the components, features, and functionality of the system 100A are described with respect to the display 106 and the computing device 102, this is not intended to be limiting. For example, all of the components, features, and/or functionality of the system 100A may be executed or included on a single device—e.g., the computing device 102 alone, the display 106 alone, etc.—and/or on a combination of devices in addition to, or alternatively from, the display 106 and the computing device 102.

Figure 3:
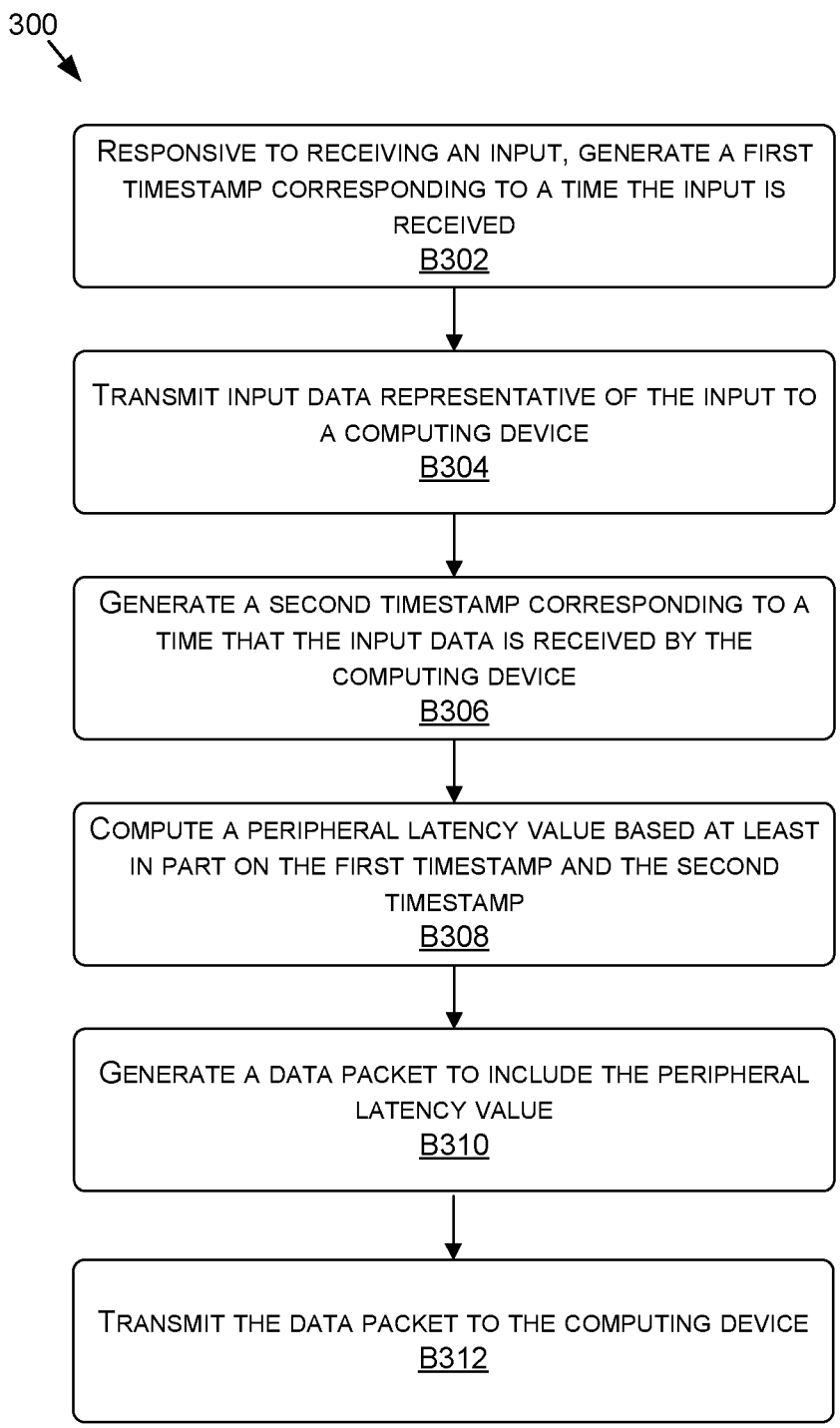
FIG. 3 is a flow diagram of a method for generating a data packet to include a peripheral latency value, in accordance with some embodiments of the present disclosure.
Figure 4:
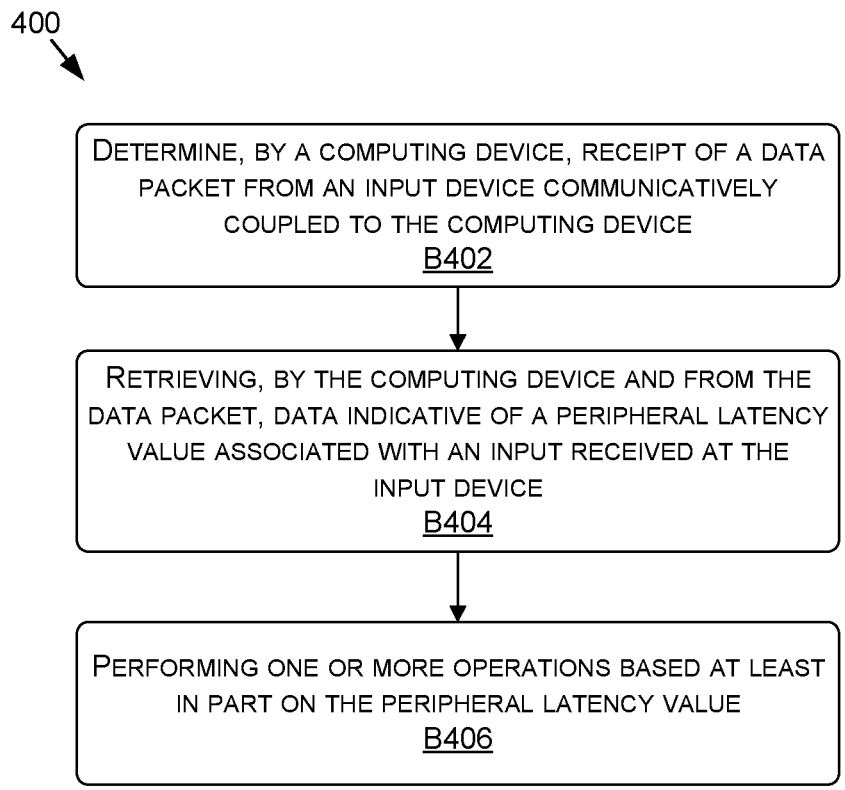
FIG. 4 is a flow diagram of a method for determining a peripheral latency from a data packet received from a human interface device, in accordance with some embodiments of the present disclosure.

Now referring to FIGS. 3-4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, methods 300 and 400 are described, by way of example, with respect to the system 100 of FIG. 1A. However, these methods 300 and 400 may additionally or alternatively be executed by any one system, or any combination of systems, including, but not limited to, those described herein.

Now referring to FIG. 3, FIG. 3 is a flow diagram of a method 300 for generating a data packet to include a peripheral latency value, in accordance with some embodiments of the present disclosure. The method 300, at block B302, includes responsive to receiving an input, generating a first timestamp corresponding to a time the input is received. For example, a first timestamp may be generated when an input receiver 118 receives and/or registers an input.

The method 300, at block B304, includes transmitting input data representative of the input to a computing device. For example, the packet generator 124 may generate a packet representative of the input data from the input and the transceiver 120 may transmit the packet to the computing device 102.

The method 300, at block B306, includes generating a second timestamp corresponding to a time that the input data is received by computing device. For example, after successful transmission and/or receipt of the packet, a second timestamp may be generated by the computing device 102 and/or the HID 104.

The method 300, a block B308, includes computing a peripheral latency value based at least in part on the first timestamp and the second timestamp. For example, the peripheral latency determiner 122 may compute the peripheral latency using the first timestamp and the second timestamp.

The method 300, at block B310, includes generating a data packet to include the peripheral latency value. For example, the packet generator 124 may generate a packet (which may correspond to the packet from block B304 or may correspond to a subsequent packet) including the peripheral latency information. The peripheral latency information may be represented in a data field of the packet that has been defined by the report descriptor 200.

The method 300, at block B312, includes transmitting the data packet to the computing device. For example, the HID 104 may transmit the packet including the peripheral latency information to the computing device 102 and/or a pass-through device (e.g., the display 106 of FIG. 1B).

With reference to FIG. 4, FIG. 4 is a flow diagram of a method 400 for determining a peripheral latency from a data packet received from a human interface device, in accordance with some embodiments of the present disclosure. The method 400, at block B402, includes determining, by a computing device, receipt of a data packet from an input device communicatively coupled to the computing device. For example, the packet interceptor 108 (and/or packet receiver 108) may determine that a data packet has been received by the HID 104.

The method 400, at block B404, includes retrieving, by the computing device and from the data packet, data indicative of a peripheral latency value associated with an input received at the input device. For example, the packet interceptor 108 of the computing device 102 may retrieve and/or receive the peripheral latency value from the data field(s) of the data packet—as defined in the report descriptor 200—corresponding to the peripheral latency.

The method 400, at block B406, includes performing one or more operations based at least in part on the peripheral latency value. For example, the computing device 102 (and/or the pass-through device) may generate a report using a report generator 112, update configuration settings using a configuration updater 114, and/or determine an end-to-end latency of the system 100—and/or a contribution of the HID 104 thereto.

Example Content Streaming System

Now referring to FIG. 5, FIG. 5 is an example system diagram for a content streaming system 500, in accordance with some embodiments of the present disclosure. FIG. 5 includes application server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 500, for an application session, the client device(s) 504 may only receive input data in response to inputs to the input device(s), transmit the input data to the application server(s) 502, receive encoded display data from the application server(s) 502, and display the display data on the display 524. As such, the more computationally intense computing and processing is offloaded to the application server(s) 502 (e.g., rendering—in particular ray or path tracing—for graphical output of the application session is executed by the GPU(s) of the game server(s) 502). In other words, the application session is streamed to the client device(s) 504 from the application server(s) 502, thereby reducing the requirements of the client device(s) 504 for graphics processing and rendering.

For example, with respect to an instantiation of an application session, a client device 504 may be displaying a frame of the application session on the display 524 based on receiving the display data from the application server(s) 502. The client device 504 may receive an input to one of the input device(s) and generate input data in response. The client device 504 may transmit the input data to the application server(s) 502 via the communication interface 520 and over the network(s) 506 (e.g., the Internet), and the application server(s) 502 may receive the input data via the communication interface 518. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 512 may render the application session (e.g., representative of the result of the input data) and the render capture component 514 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 502. In some embodiments, one or more virtual machines (VMs)—e.g., including one or more virtual components, such as vGPUs, vCPUs, etc.—may be used by the application server(s) 502 to support the application sessions. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
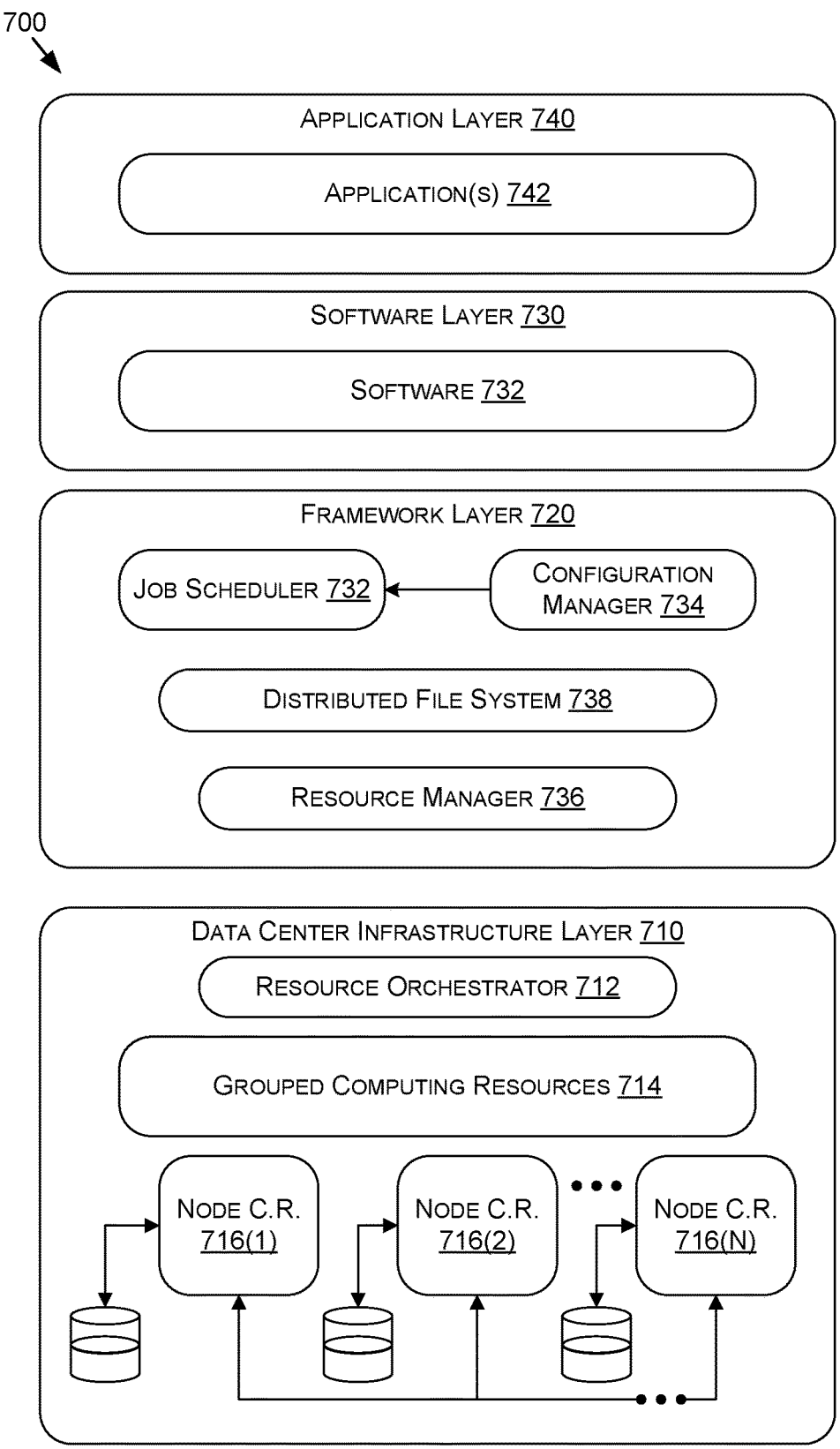
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, and/or other processors may be grouped within one or more racks to provide compute resources to support one or more workloads. The one or more racks may also include any number of power modules, cooling modules, and/or network switches, in any combination.

The resource orchestrator 722 may configure or otherwise control one or more node C.R.s 716(1)-716(N) and/or grouped computing resources 714. In at least one embodiment, resource orchestrator 722 may include a software design infrastructure ("SDI") management entity for the data center 700. The resource orchestrator 722 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 1036 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving, using a computing device, input data from an input device, the input data representative of an input received by the input device;
   receiving, using the computing device, latency data from the input device, the latency data indicative of a latency value that is computed using the input device and corresponding to an amount of time between the input being received by the input device and the input data representative of the input being received by the computing device;
   determining, using the computing device, the latency value using the latency data; and
   causing, using the computing device and after the receiving of the input data, a display to present content associated with the input data.

2. The method of claim 1, wherein the latency value is a first latency value, and the method further comprises:
   determining a second latency value corresponding to another amount of time between the input data being received by the computing device and the display presenting the content associated with the input data; and
   computing an end-to-end latency value based at least on the first latency value and the second latency value.

3. The method of claim 2, further comprising displaying content representative of at least one of the first latency value, the second latency value, or the end-to-end latency value.

4. The method of claim 1, wherein the computing device includes the display, and the display includes pass-through functionality for a connection type of the input device.

5. The method of claim 1, wherein the receiving the latency data comprises receiving a data packet that includes the latency data, the data packet including a data field corresponding to the latency value.

6. The method of claim 5, wherein, during configuration of the input device, data representative of a report descriptor corresponding to the input device is received, the report descriptor identifying a location of the data field within the at data packet.

7. A method comprising:
   receiving an input using an input device;
   generating, using the input device based at least on the receiving the input, a first timestamp corresponding to a time the input is received;
   sending, using the input device, input data representative of the input to a computing device;
   based at least on the sending the input data, generating, using the input device, a second timestamp corresponding to a time the input data is received by the computing device;
   determining, using the input device and based at least on the first timestamp and the second timestamp, a latency between the time the input was received by the input device and the time the input data was received by the computing device;
   generating, using the input device, a data packet to include a latency value representing the latency; and
   sending, using the input device, the data packet to the computing device.

8. The method of claim 7, wherein the determining the latency includes determining a difference between the first timestamp and the second timestamp, the latency value being equal to the difference.

9. The method of claim 7, further comprising:
   during configuration, sending data representative of a report descriptor, the report descriptor including an indication that at least one individual data packet includes a data field designated for latency values.

10. The method of claim 9, wherein the generating the data packet includes populating the data field with latency value.

11. The method of claim 7, wherein the latency value is used as one latency component of a plurality of latency components for determining an end-to-end latency of the computing device.

12. A system comprising:
    one or more processing units to:
      receive a data packet from an input device communicatively coupled to a computing device;
      retrieve, from the data packet, data indicative of a first latency value associated with an input received at the input device, the first latency value corresponding to a first amount of time between the input being received by the input device and input data representative of the input being received by the computing device; and
      determine a second latency value corresponding to a second amount of time between the input data being received by the computing device and a display presenting content associated with the input data.

13. The system of claim 12, wherein the system is comprised in at least one of:
    a display device;
    a control system for an autonomous or semi-autonomous machine;
    a system for performing simulation operations;
    a system for performing deep learning operations;
    a system implemented using an edge device;
    a system implemented using a robot;
    a system incorporating one or more virtual machines (VMs);
    a system implemented at least partially in a data center; or a system implemented at least partially using cloud computing resources.

14. The system of claim 12, wherein the one or more processing units are further to:
determine an end-to-end latency value based at least on the first latency value and the second latency value.

15. The system of claim 13, wherein the one or more processing units are further to display content representative of at least one of the first latency value, the second latency value, or the end-to-end latency value.

16. The system of claim 12, wherein the data is retrieved by intercepting the data packet based at least on the data packet being received.

17. The system of claim 12, wherein at least one individual data packet received from the input device includes a data field corresponding to the first latency value, and the data is retrieved from an instance of the data field in the at least one data packet.

18. The method of claim 1, wherein the latency value is computed by the input device by at least an amount of time elapsed between receiving the input using the input device and transmitting the input data using the input device to the computing device.

19. The method of claim 1, wherein the latency value is computed by the input device by at an the amount of time elapsed between receiving the input using the input device, transmitting the input data using the input device to the computing device, and receiving a return signal from the computing device that the input data was successfully received.

20. The method of claim 7, wherein the computing device causes a display to present content associated with the input after receiving the input data from the input device.

* * * * *